UNITED STATES PATENT OFFICE 2,094,090

BENZOTHIAZYL SULPHONIUM COMPOUNDS

Alfred William Baldwin, Blackley, Manchester, England, assignor to Imperial Chemical Industries Limited, a corporation of Great Britain No Drawing. Application April 17, 1935, Serial No. 16,892. In Great Britain April 26, 1934

9 Claims. (Cl. 260—44)

This invention relates to the manufacture of new compounds which are valuable for the treatment of textiles.

My invention contemplates the preparation of novel compounds of the type aforementioned, the preparation of certain novel intermediate compounds useful for the manufacture of the former, and the provision of practical and efficient processes for preparing both the final compounds and said intermediates. Other and further objects of this invention will appear as the description proceeds.

I accomplish the objects of my invention by reacting 1 molecular proportion of a 2-alkyl-mercapto-benzothiazole, which may or may not carry substituents such as a methyl, methoxyl or ethoxyl group on the benzene nucleus, and in which "alkyl" represents a saturated or unsaturated fatty chain containing at least eight carbon atoms, with approximately 1 molecular proportion of a lower alkyl ester of an inorganic acid, for example, dimethyl sulphate or ethyl chloride or iodide. By the term "lower alkyl" I mean an alkyl radical having not over six carbon atoms, for instance, methyl, ethyl, propyl, isopropyl, butyl, etc.

The final products thus obtained are most probably sulphonium compounds and correspond to the general formula

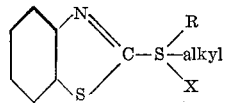

wherein alkyl stands for a saturated or unsaturated fatty chain containing at least eight carbon atoms; R stands for a lower alkyl radical, that is one having not over six carbon atoms; X stands for an inorganic acid ion such as chlorine, bromine or metho-sulphate; and the benzene ring may carry neutral, non-ionizing substituents such as halogen, methyl, methoxy or ethoxy.

In carrying the invention into effect the conditions may vary according to the lower alkyl inorganic ester used. Thus, the reaction between 2-alkyl-mercapto-benzothiazoles and dimethyl sulphate can conveniently be carried out at 90–100° C. under ordinary atmospheric conditions, while if ethyl chloride is to be used in place of dimethyl sulphate, it is desirable to carry out the reaction in a closed vessel. These variations, however, follow the general lines of practice with these reagents, and are well known to those skilled in the art.

2-alkyl-mercapto-benzothiazoles suitable for use as starting material for the present invention may be prepared by reacting (as hereinafter described) an alkyl-halide with an alkali-metal-2-mercapto-benzothiazole. Alternatively, they may be prepared by reacting 2-mercapto-benzothiazoles with sulphuric esters of the higher alcohols. Suitable 2-alkyl-mercapto-benzothiazoles are, for example, 2-octadecyl-, 2-dodecyl- and 2-octadecenyl-mercapto-benzothiazole or the corresponding compounds derived from 2-mercapto-6-methyl-benzothiazole, 2-mercapto-4-methyl-benzothiazole or 2-mercapto-6-methoxy-benzothiazole.

The new compounds made according to the present invention possess emulsifying properties and are valuable for the treatment of textiles. For example, they may usefully be employed as softening and cleansing agents.

The invention is illustrated but not limited by the following examples, in which the parts are by weight.

*Example 1*

20 parts of 2-octadecyl-mercapto-benzothiazole (m. p. 43–44° C.) are stirred at 100° C. with 6 parts of dimethyl sulphate. Heat is evolved as the reaction proceeds. When a sample dissolves completely in warm water to a clear foaming solution, reaction is complete. The reaction mixture, on cooling, sets to a soap-like almost white solid which is the desired product in a sufficiently pure state for use. The compound thus obtained may be designated octadecyl-benzothiazyl-methyl-sulphonium-metho-sulphate.

If ethyl chloride is employed in the above example in a sealed vessel, the product is octadecyl-benzothiazyl-ethyl-sulphonium-chloride.

The new product is valuable for the treatment of textiles. For example, if cotton limbric is immersed in a solution of 1 part of the new product in 1,000 parts of water at 40° C. and then dried without rinsing, a soft handle is imparted to the fabric.

The 2-octadecyl-mercapto-benzothiazole used in the above example may be prepared by boiling under a reflux condenser for six hours equivalent molecular proportions of octadecyl-bromide dissolved in butyl alcohol and the sodium salt of mercapto-benzothiazole and then removing the solvent by evaporation under reduced pressure. The crude product thus obtained may be crystallized from acetone to give colorless leaflets melting at 43–44° C.

Example 2

31.8 parts of 2-dodecyl-mercapto-benzothiazole (obtained as a viscous pale yellow oil, B. P. 250–255° C./10 mm. by interaction of dodecyl-bromide and sodium mercapto-benzothiazole) and 12.6 parts of dimethyl sulphate are stirred together at 90–95° C. until a sample dissolves in water to give a perfectly clear foaming solution. The reaction mixture on cooling sets to a clear jelly which is the desired product and which is in sufficiently pure form for use in the treatment of textiles.

The compound thus obtained is most probably dodecyl-benzothiazyl-methyl-sulphonium-methosulphate.

It will be understood that the above procedures may be varied within wide limits, without departing from the spirit of this invention.

I claim:

1. A sulphonium compounds of the general formula

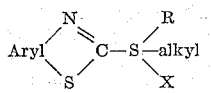

wherein alkyl stands for an aliphatic chain containing at least 8 carbon atoms, R is a lower alkyl radical containing not over 6 carbon atoms, X is an inorganic acid ion, while aryl represents an ortho-divalent aryl radical of the benzene series.

2. A sulphonium compound of the general formula

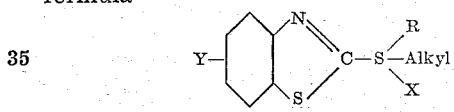

wherein alkyl stands for an aliphatic chain containing at least 8 carbon atoms, R is a lower alkyl radical containing not over 6 carbon atoms, X is an inorganic acid ion, and wherein Y stands for a member of the group consisting of hydrogen, halogen, lower alkyl and lower alkoxy.

3. Octadecyl-benzothiazyl-methyl-sulphonium-metho-sulphate.

4. Dodecyl-benzothiazyl-methyl-sulphonium-metho-sulphate.

5. The process of producing a textile assistant which comprises heating together a 2-alkyl-mercapto-benzothiazole, in which the alkyl group is an aliphatic chain containing at least 8 carbon atoms, and a lower alkyl ester of an inorganic acid.

6. The process of producing an organic sulphonium compound which comprises condensing, by heating to the temperature of spontaneous reaction, a compound of the general formula

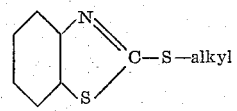

wherein alkyl stands for an aliphatic chain containing at least 8 carbon atoms, in substantially equimolecular proportions, with an alkylating agent adapted to introduce a lower alkyl radical of not more than 6 carbon atoms, and recovering the condensation product.

7. The process of producing an organic sulphonium compound which comprises heating substantially 20 parts of 2-octadecyl-mercapto-benzothiazole with substantially 6 parts of dimethylsulphate at about 100° C. until a test sample dissolves in water to a clear, foaming solution, and recovering the soap-like reaction product.

8. The process of producing an organic sulphonium compound which comprises heating substantially 31.8 parts of 2-dodecyl-mercapto-benzothiazole with substantially 12.6 parts of dimethylsulphate at about 90–95° C. until a test sample dissolves in water to a clear, foaming solution, and recovering the jelly-like reaction product.

9. The process of preparing a textile assistant, which comprises heating together under reflux conditions a long-chain alkyl ester of an inorganic acid with an alkali-metal salt of 2-mercapto-benzothiazole, and condensing the 2-alkyl-mercapto-benzothiazole thus obtained with a lower-alkyl ester of an inorganic acid to produce a tertiary sulphonium compound.

ALFRED WILLIAM BALDWIN.